3,835,076
AQUEOUS SEALER COMPOSITION OF AN EPOXY ESTER RESIN OF A MALEINIZED DRYING OIL FATTY ACID AND AN EPOXY RESIN AND AN ACRYLIC-EPOXY ESTER GRAFT COPOLYMER
Jeffery J. Jeffery, Davison, and Aloysius N. Walus, Flint, Mich., assignors to E. I. du Pont de Nemours and Company, Wilmington, Del.
No Drawing. Filed Nov. 30, 1972, Ser. No. 310,951
Int. Cl. C08g 45/08; C09d 3/52, 3/58
U.S. Cl. 260—23 EP      12 Claims

ABSTRACT OF THE DISCLOSURE

The aqueous sealer composition contains a polymeric binder in an aqueous medium in which the polymeric binder comprises the following components:

(A) an epoxy ester resin of a maleinized drying oil fatty acid such as maleinized linseed oil fatty acids and an epoxy hydroxy polyether resin; and
(B) an acrylic-epoxy ester graft copolymer that has a backbone of methyl methacrylate, styrene, ethyl acrylate, acrylonitrile or mixtures thereof, contains 1-7% of methacrylic acid or acrylic acid which has been reacted with an alkylene imine and the polymeric side-chain segments of the graft copolymer are epoxy esters of an epoxy resin and an aliphatic dicarboxylic acid;

the novel composition forms a high quality coating composition and is particularly useful as a sealer composition for automobile and truck bodies over which finishes of acrylic lacquers, acrylic enamels, acrylic dispersion lacquers or enamels and acrylic powders can be applied.

BACKGROUND OF THE INVENTION

This invention relates to a coating composition and in particular to a high quality aqueous sealer composition of an epoxy ester resin and an acrylic-epoxy ester graft copolymer.

Sealer compositions are well known in the automobile and truck manufacturing industry and are applied over primed steel substrates to form a smooth even surface over which an acrylic lacquer, an acrylic dispersion lacquer or an acrylic enamel topcoat is applied. Typical sealer compositions are shown in Swanson and Walus U.S. Pat. 3,272,647 issued Sept. 13, 1966; Jeffrey et al. U.S. Pat. 3,505,269, issued Apr. 7, 1970; Rohrbacher U.S. Pat. 3,509,086 issued Apr. 28, 1970. These prior art sealer compositions are excellent for many purposes, however there is a great need in the automobile manufacturing industry today for a non-airpolluting aqueous sealer composition that provides a finish with excellent mar, chip and crack resistance, outstanding corrosion resistance, that has an exceptional high level of adhesion to all types of primer coatings including electrodeposited primer coatings and that provides a surface to which acrylic topcoats of all types such as acrylic lacquers, acrylic dispersion lacquers and enamels and acrylic powders will have excellent adherence.

The novel composition of this invention provides a non-polluting finish and utilizes an acrylic-epoxy ester graft copolymer in combination with an epoxy ester resin and provides a sealer with excellent adhesion to conventional primers and all types of acrylic lacquers and acrylic powder topcoats used for automobile and truck bodies.

SUMMARY OF THE INVENTION

The aqueous sealer composition of this invention comprises about 2–50% by weight of a binder in 50–98% by weight water and optionally can contain up to 20% of solvent for the binder wherein the binder consists essentially of (A) 60–95% by weight, based on the weight of the binder of an epoxy ester resin of a maleinized drying oil fatty acid and an epoxy resin wherein the maleinized drying oil fatty acid is the reaction product of maleic anhydride and a drying oil fatty acid and the epoxy resin is of the formula

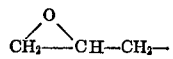

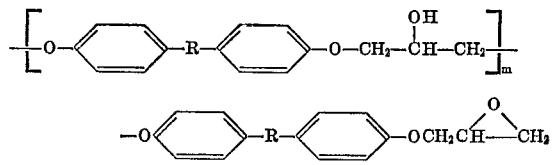

where R is an alkylene group having 1–4 carbon atoms and m is a positive integer that is sufficiently large to provide a weight average molecular weight of about 400–4,000, and
(B) 5–40% by weight, based on the weight of the binder, of an acrylic epoxy ester graft copolymer that has a number average molecular weight of about 10,000–150,000 and has a polymeric backbone segment and polymeric side-chain segments; wherein
(1) the polymeric backbone segment of the graft copolymer comprises 20–80% by weight of the graft copolymer and consists essentially of polymerized units that are either methyl methacrylate, styrene, ethyl acrylate, acrylonitrile or mixtures thereof; 1–7% by weight, based on the weight of the copolymer, of an $\alpha,\beta$-ethylenically unsaturated carboxylic acid such as methacrylic acid or acrylic acid which has been reacted with an alkylene imine; and
(2) the polymeric side-chain segment of the graft copolymer comprises correspondingly 80–20% by weight of the graft copolymer and are grafted into the backbone segment and have the following formula:

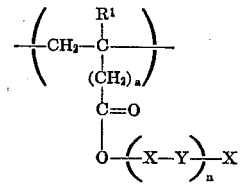

wherein $a$ is 0–1 and when $a$ is 1,

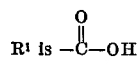

and when $a$ is 0,
R' is

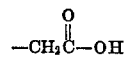

in either case $R^1$ has been reacted with an alkylene imine, X is a polyphenoxy polyether resin having a weight average molecular weight of about 400–4,000 and Y is the residual of a saturated aliphatic dicarboxylic acid that has 4–15 carbon atoms or a dimer fatty acid, and $n$ is a positive integer of 3–10; wherein the sealer composition is at least partially neutralized with ammonium hydroxides or a water soluble amine and has a pH of about 7-11.

Description of the Invention

The novel composition of this invention preferably has a polymeric binder content of about 5-25% by weight. The polymeric binder preferably comprises 75-90% of the epoxy ester resin of a maleinized drying oil fatty acid and an epoxy resin and correspondingly 10-25% by weight of the acrylic epoxy ester graft copolymer. The novel composition can be clear or pigmented and if pigmented contains about 0.1-30% by weight of pigment.

The composition has excellent physical properties such as good adhesion to bare metal substrates, chip resistance, crack and mar resistance and corrosion resistance. The composition can be used as a primer over bare metals but is particularly useful as a sealer composition which is applied over primed metal surfaces. Acrylic enamel, acrylic lacquer, acrylic dispersion lacquer, acrylic enamels, acrylic dispersion enamels, acrylic powder coating or water based acrylic lacquer or enamel topcoats have excellent adhesion to the novel sealer composition and form particularly attractive finishes.

The novel composition can also be utilized as a sealerless primer, or as a primer surfacer. Also, the novel composition can be used as a topcoating for appliances, such as refrigerators, stoves, washers, driers and the like.

In particular, the novel sealer composition of this invention can be used as a non-air-polluting coating system. The novel sealer can be applied over electro-deposited or other conventionally applied aqueous primers and an aqueous topcoat or a powder topcoat can be applied. Aqueous acrylic lacquers or aqueous thermosetting acrylic enamels can be used. The novel sealer can be made electrically conductive by the addition of carbon black which allows the electrostatic application of acrylic lacquer powders or thermosetting acrylic powders.

The epoxy ester resin of the maleinized drying oil fatty acid and the epoxy resin is formed by initially preparing a maleinized drying oil fatty acid and then reacting this product with an epoxy resin and the resulting epoxy ester resin has an acid number of about 30-150. This resin is then neutralized with a water-soluble amine to a pH of about 7-11. In the novel sealer composition, the epoxy ester resin aids in dispersing the acrylic epoxy ester graft copolymer in the sealer composition.

The neutralized (pH 7-11) epoxy ester resin can be used as an aqueous sealer, primer or a primer surfacer alone to form a high quality product. This composition can be pigmented with conventional pigments and can be applied by using conventional techniques.

The maleinized drying oil fatty acids are prepared by reacting maleic anhydride with one or more of the conventional drying oil fatty acids at about 170° C. to 210° C. for about 2 to 5 hours. Typical drying oil fatty acids that can be used are linseed oil fatty acids, tung oil fatty acids, soya oil fatty acids and dehydrated castor oil fatty acids. Linseed oil fatty acids are preferred.

The maleinized drying oil fatty acids are then reacted with an epoxy resin at about 70° C. to 100° C. for about 30 to 90 minutes. The product can then be neutralized or neutralized when blended with the acrylic-epoxy ester graft copolymer to form the novel sealer composition.

Typical epoxy resins that are used to prepare the epoxy ester resin have the following structure

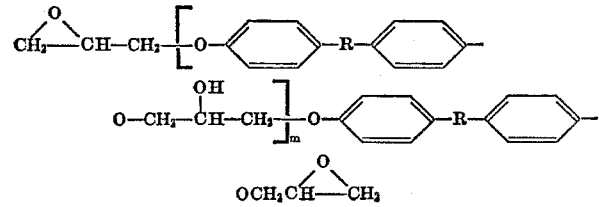

where R is an alkylene group of 1-4 carbon atoms and $m$ is a positive integer sufficiently large to provide a weight average molecular weight of 400 to 4,000.

One preferred epoxy resin is the reaction product of epichlorohydrin and bisphenol A which provides a resin in which R is

Another very useful epoxy resin is the reaction product of epichlorohydrin and bisphenol F which provides a resin in which R is $-CH_2-$.

Ammonium hydroxides or a water-soluble amine can be used to neutralize the epoxy ester resin and to adjust the pH of novel sealer composition to a pH of 7-11 preferably 9-10. Typical water soluble amines are as follows: primary amines, secondary amines, tertiary amines, polyamines and hydroxyamines, such as ethanolamine, dimethylethanolamine, diethanolamine, triethanolamine, n-methylethanolamine, N,N-diethylethanolamine, N-aminoethanolamine, N-methyldiethanolamine, monoisopropanolamine, diisopropanolamine, triisopropanolamine, hydroxyamine, butanolamine, hexanolamine, methyl diethanolamine, diethylamine, ethylene diamine, diethylene triamine, diethylene tetramine, hexamethylene tetramine, triethylamine, diethyl ethanol amine and the like.

The graft copolymer utilized in the novel composition of this invention is prepared by first forming epoxy ester prepolymers which are the side-chain segments of the graft copolymers using conventional polymerization techniques. These epoxy ester prepolymers are prepared so that each prepolymer chain contains at least one ethylenically unsaturated dicarboxylic acid such as itaconic acid. Maleic acid and fumaric acid also can be used. These prepolymers and the backbone acrylic monomer units are polymerized to form the graft copolymer. The ethylenically unsaturated group of the epoxy ester prepolymer polymerizes with the backbone monomer units and couples the epoxy ester prepolymer to the backbone of the graft copolymer. The resulting epoxy ester graft copolymer has a number average molecular weight of about 10,000-150,000 and preferably 15,000-50,000; the graft copolymer comprises about 20-80% by weight, preferably 30-60% by weight of backbone segment, and correspondingly, 80-20% by weight, and preferably 70-40% by weight, of side chain segments. The side chain segments have a molecular weight in the range of about 2,000-20,000.

The epoxy ester prepolymers are prepared by conventional polymerization techniques in which an epoxy hydroxy polyether resin, a saturated aliphatic dicarboxylic acid or a dimer fatty acid and an ethylenically unsaturated dicarboxylic acid are blended together with solvents, and a polymerization catalyst and are heated to about 120-200° C. for about 1-3 hours to form the epoxy ester prepolymer. The resulting epoxy ester prepolymers have one terminal group of ethylenic unsaturation provided by the itaconic acid monomer and are terminated with the epoxy phenoxy polyether resin. The resulting prepolymer structure can be illustrated as follows: itaconic acid/epoxy polyether resin/dicarboxylic acid/epoxy polyether resin.

Typical solvents and diluents which are used to prepare the epoxy ester prepolymer are, for example, toluene, xylene, butyl acetate, acetone, methylisobutyl ketone, methylethyl ketone, isopropanol, butanol, hexane, ethylene glycol monoethyl ether, ethylene glycol monoethyl ether acetate, V M and P naphtha, mineral spirits and other aliphatic, cycloaliphatic, aromatic hydrocarbons, esters, ethers, ketones and alcohols. Preferably, water miscible solvents are used such as acetone, ethylene glycol monobutyl ether, isopropanol and the like.

About 0.1–4% by weight, based on the total weight of the monomers used to prepare the epoxy ester prepolymer, of a polymerization catalyst is used, such as sulfonic acid, organic tin compounds, such as dibutyl tin dilaurate, dibutyl tin oxide, litharge, titanium complexes, aromatic ammonium hydroxide compounds, for example, benzyltrimethylammonium hydroxide and tetramethylammonium chloride.

The epoxy hydroxy polyether resins utilized in preparing the epoxy ester prepolymers have the repeating structural formula

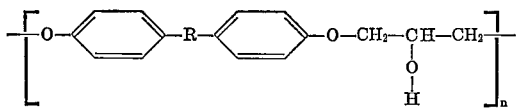

wherein R is defined as above and $n$ is an integer sufficiently large to provide the epoxy resin with a weight average molecular weight of at least about 400 and up to about 4,000, and preferably, epoxy resins are used that have a molecular weight of 1500–3000.

Typical dicarboxylic acids that can be used to prepare the epoxy ester prepolymers are, for example, aliphatic dicarboxylic acids having 4–15 carbon atoms, dimer acids or a mixture of any of these acids and anhydrides of these acids. Typical saturated aliphatic dicarboxylic acids are succinic, glutaric, adipic, pimelic, suberic, azelaic, brassic, dodecanodoic, brassylic and the like. Dimer fatty acids are the dimerization products of ethylenically unsaturated drying oil fatty acids. Typically useful dimer fatty acids are "Empol" 1014, "Empol" 1022, "Empol" 1024. One particular useful dimer fatty acid is the dimerization product of an 18 carbon atom drying oil fatty acid.

The graft copolymer is then prepared by adding the backbone constituents to the above epoxy ester prepolymers. The constituents can be diluted with one of the aforementioned solvents and a polymerization catalyst is added and the constituents are heated to about 75–150° C. for about 2–6 hours to form the graft copolymer.

Another method that can be used is to add the backbone monomers to the epoxy resin, itaconic acid and dicarboxylic acid mixture. The aforementioned epoxy ester prepolymers will be first formed and then on the addition of the polymerization catalyst for the esterification polymerization reaction and upon addition of the vinyl polymerization catalyst, the backbone monomer units polymerize and form the backbone of the polymer.

About 0.1–4% by weight, based on the weight of the constituents used to prepare the graft copolymer, of an azo polymerization catalyst for the backbone monomers is used, such as azo-bis-isobutyronitrile.

Typical monomer units which are used to form the backbone of the graft copolymer are styrene, acrylonitrile, methyl methacrylate, ethyl acrylate or mixtures thereof. Up to 7% by weight of the copolymer of units of α,β-unsaturated monocarboxylic acid can be used such as acrylic acid, and methacrylic acid.

About 0.5 to 5% by weight, based on the weight of the backbone segment of the polymer, of acrylic monomers which have compatibilizing or adhesion promoting groups, can be utilized in place of the above acid monomers which are subsequently iminated. Typical monomers of this type are hydroxyaminopropyl methacrylate, 2-(1-aziridinyl)-ethyl methacrylate, 3-(2-methacryloxyethyl) - 2,2 - spirocyclohexyloxazolidine tertiary butylaminoethyl methacrylate and diethylaminoethyl methacrylate.

After the acrylic epoxy ester graft copolymer is formed, it is reacted with alkylene imine of the formula

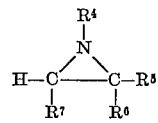

to esterify the pendent carboxyl groups on the polymer. In the formula, $R^4$ is either hydrogen, benzyl, or a $C_1$–$C_5$ alkyl radical, $R^5$ and $R^6$ are either hydrogen, benzyl, aryl, or a $C_1$–$C_5$ alkyl radical and $R^7$ is either hydrogen and $R^5$ is either hydrogen or methyl. The two preferred alkylene imines are ethylene imine and propylene imine.

Small amounts of plasticizer, for example, 0.1–5% by weight, based on the weight of film-forming constituents, can also be used in the novel sealer composition, such as butyl benzyl phthalate, dibutyl phthalate, triphenyl phosphate, 2-ethylhexylbenzyl phthalate, dicyclohexyl phthalate, dibenzyl phthalate, butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetylbutyl citrate, dibenzyl sebacate, tricresyl phosphate, toluene ethyl sulfonamide, the di-2-ethylhexylester of hexamethylene diphthalate, di(methylcyclohexyl) phthalate.

Other plasticizers that can be used are epoxidized soya bean oil, oil-free and oil-modified alkyd resins, and polyesters, such as polyethylene terephthalate esters, polyalkylene adipate esters, polyacrylene adipate esters, polyesters of adipic acid/neopentyl glycol/benzoic acid, coconut oil/phthalic anhydride/ethylene glycol and the like.

Pigments can be used in the novel sealer composition of this invention in the amounts of 0.1–30.0% by weight, and preferably, about 10–25% by weight of pigment, is used. Preferably, the pigment is formed into a mill base using conventional techniques and then blended with the composition. Examples of the great variety of pigments which are used in the novel sealer composition of this invention are metallic oxides, preferably titanium dioxide, iron oxide, zinc oxide and the like, metal hydroxides, metal flakes such as aluminum flakes, metal powders, chromates, such as lead chromate, sulfides, sulfates, silicates such as calcium silicate, magnesium silicate, aluminum silicate, carbonates, carbon black, silica talc, china clay, organic reds, maroons, organic dyes, lakes, etc. One preferred pigment blend for sealerless primer composition is as follows: carbon black, titanium dioxide and aluminum silicate. Electrically conductive carbon black can be used to provide an electrically conductive surface.

Optionally, the novel sealer composition of this invention can contain from about 2–20% by weight, based on the weight of the film-forming constituents, of a water dispersible heat reactive condensate, for example, hexa(methoxymethyl)melamine can be used.

The novel sealer compositions of this invention can be applied to a variety of substrates, for example, unprimed or primed metal substrates, wood, glass, plastics, such as polypropylene, styrene, copolymers of styrene and the like, by any of the usual application methods, such as spraying, electrostatic spraying, electrodeposition, dipping, brushing, flow coating and the like. These coatings are baked at about 110–200° C. for about 10–60 minutes. The resulting coating is about 0.1–2 mils thick, preferably 0.1–1 mil thick and can be buffed or sanded in accordance with conventional techniques, if desired, to improve smoothness.

The novel sealer composition of this invention has excellent adhesion to bare or treated metals or to metals which have been previously painted with alkyd or acrylic enamels or lacquers. Also, in addition to its use as a sealerless primer, the novel composition can be a highly pigmented coating or can be used as a clear sealer coating. When used as a primer or a sealer composition, topcoats of lacquers, enamels and powders have excellent adherence to the novel coating composition of this invention which also has excellent mar and chip and scratch resistance.

The following Examples illustrate this invention. The parts and percentages are by weight unless otherwise specified.

EXAMPLE 1

A resin solution is prepared by reacting a maleic anhydride with linseed oil fatty acids:

| Portion 1: | Parts by weight |
|---|---|
| Linseed oil fatty acids | 2,670 |
| Maleic anhydride | 930 |
| Xylene | 111 |
| Portion 2: | |
| Cyclohexanone | 289 |
| Total | 4,000 |

Portion 1 is charged into a reaction vessel equipped with a stirrer, a reflux condenser, a heating mantel and a nitrogen inlet. The ingredients are blanketed with the nitrogen gas and then heated slowly up to about 200° C. for an hour and a half and continued for about 4 hours to complete the reaction. Portion 2 is then slowly added over a fifteen minute period. The resin has an acid number of about 280–300 determined by an alcoholic potassium hydroxide solution. The resin solution has a solids content of about 90% and is hereinafter referred to as a MALOFA Resin solution.

A high molecular weight Epoxy/MALOFA resin solution is prepared as follows:

| Portion 1: | Parts by weight |
|---|---|
| Epoxy resin ("Epon" 828 [1]) | 463 |
| Bis-phenol A (p,p'-isopropylidenediphenol) | 191 |
| Diethylene glycol monobutyl ether acetate | 204 |
| Cyclohexanone | 80 |
| Acetone | 10 |
| Portion 2: | |
| Bis-phenol A (p,p'-isopropylidenediphenoyl) | 56 |
| Portion 3: | |
| Dimethyl benzylamine | 6 |
| Portion 4: | |
| Acetone | 82 |
| Diethylamine | 6 |
| Portion 5: | Parts by weight |
| Acetone | 42 |
| Portion 6: | |
| MALOFA resin solution (prepared above) | 333 |
| Portion 7: | |
| Ethylene glycol monobutyl ether | 193 |
| Total | 1666 |

[1] "Epon" 828 has the following structural formula

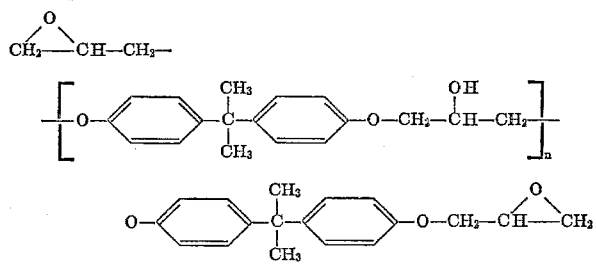

$n$ is a positive integer sufficiently large to provide a Gardner-Holdt viscosity measured on undiluted resin at 25° C. of 100–160 poises and has an epoxy equivalent of 180–195. The epoxide equivalent is the grams of resin containing 1-gram equivalent of epoxide.

Portion 1 is charged into a reaction vessel equipped with a stirrer, a reflux condenser and a heating mantel and the reaction mixture is heated to its reflux temperature and maintained at its reflux temperature for about a half hour. The reaction mixture is cooled to about 160° C. and the Portion 2 is added and immediately after Portion 2 is added, Portion 3 is added. The reaction mixture is then heated to its reflux temperature of about 175° C. and held at this temperature for about one hour and twenty minutes. Portion 4 is then slowly added over a 30 minute period and the temperature of the reaction mixture is allowed to cool to about 85° C. and then the reaction mixture is brought back to its reflux temperature of about 90° C. Portion 5 is then added and then Portion 6, and held for 90 minutes at 80–90° C. Portion 7 is added to dilute the polymer solution.

The resulting polymer has an acid number of about 83 and the polymer solution has a Gardner-Holdt viscosity of Z6$^{+4}$ and a polymer solids content of about 60%.

An epoxy acrylic copolymer solution is prepared by blending in the following ingredients:

| Portion 1: | Parts by weight |
|---|---|
| Epoxy resin ("Epon" 1004 described in Example 1) | 369.3 |
| Adipic acid monomer | 26.0 |
| Itaconic acid monomer | 4.7 |
| Benzyltrimethyl ammonium hydroxide solution (40% solids in methanol) | 4.0 |
| Lithium ricinoleate | 0.4 |
| Ethylene glycol monobutyl ether | 172.0 |
| Portion 2: | |
| Ethylene glycol monoethyl ether | 228.0 |
| Portion 3: | |
| Isopropyl alcohol | 398.0 |
| Ethyl acetate | 400.0 |
| Dodecyl mercaptan | 2.0 |
| Portion 4: | |
| Methyl methacrylate monomer | 360.0 |
| Tertiary butyl aminoethyl methacrylate | 8.0 |
| Methacrylic acid monomer | 32.0 |
| Azobisisobutyronitrile | 2.0 |
| Portion 5: | |
| Azobisisobutyronitrile | 1.0 |
| Portion 6: | |
| Azobisisobutyronitrile | 0.5 |
| Portion 7: | |
| Azobisisobutyronitrile | 0.5 |
| Portion 8: | |
| Propylenimine | 30.0 |
| Total | 2038.4 |

Portion 1 is premixed and charged into a reaction vessel equipped with a stirrer, a heating mantel, a thermometer and a reflux condenser and the ingredients are heated until a solution is formed and then heated to reflux with constant agitation for 60 minutes at 150–160° C. Portion 2 is then added and then Portion 3 which is premixed is added over a 9 minute period. Portion 4 is premixed and then added over a 3 minute period and then the reaction mixture is heated to its reflux temperature and is maintained at reflux for about 1 hour. Portion 5 is added and the reaction mixture is refluxed for an additional ½ hour. Portion 7 is added and the reaction mixture is refluxed for another hour. The heat is then turned off and Portion 8 is added and the reaction mixture is held slightly below its reflux temperature for another hour and the polymer solution is cooled to room temperature.

The polymer solution has a solids content of about 39.5% and a Gardner-Holdt viscosity measured at 25° C. of about Y. The polymer has an acid number of about 0.4 and a relative viscosity measured in dimethyl formamide at 25° C. of about 1.108.

A mill base is prepared as follows:

| | Parts by weight |
|---|---|
| Epoxy/MALOFA resin solution (prepared above) | 540 |
| Dimethylethanolamine | 78 |
| Deionized water | 1182 |
| Carbon black pigment (electrically conductive carbon black) | 180 |
| Aluminum silicate pigment | 612 |
| Titanium dioxide pigment | 408 |
| Total | 3000 |

The above ingredients are mixed together in the order given and then charged into a steel ball mill and ground for sixteen hours. The resulting mill base has a total solids of 50.8% and a pigment content of 40% by weight, a binder content of 10.8% by weight.

A water reducible sealer composition is prepared as follows:

| | Parts by weight |
|---|---|
| Epoxy/MALOFA resin solution (prepared above) | 93.5 |
| Epoxy acrylic graft copolymer solution (prepared above) | 42.5 |
| Dimethyl ethanolamine | 13.0 |
| Deionized water | 172.0 |
| Mill base (prepared above) | 250.0 |
| Total | 571.0 |

The above ingredients are thoroughly blended together in the order shown to form a sealer composition which has a solids content of 35%, a pigment to binder ratio of 100:100 and a pH of about 9.3%. The resulting sealer composition is then reduced to a spray viscosity about 18 seconds measured in a No. 1 Ford cup at 25° C. by reducing the composition with an equal volume of water.

The sealer is then sprayed onto the following sets of primed steel panels (3 per set): a steel panel primed with an iron oxide pigment alkyd resin primer, a steel panel primed with a titanium dioxide pigmented acrylic resin. After the sealer is sprayed onto the above steel panel each of the panels is air dried for several seconds. The resulting sealer coating is about 0.1 mils of thickness.

A coating of a standard automotive acrylic lacquer is then applied over the sealer coating on each of the panels and baked using conventional spraying and baking procedures. On a second set of the above primed and sealed panels an acrylic powder coating is electrostatically deposited on the panels and baked by using conventional procedures. On a third set of the above primed and sealed panels a water based thermosetting acrylic enamel is applied and baked using conventional procedures. Each of the above sets of steel panels is then tested for chip resistance by a standard Gravelometer chip test for adhesion of the sealer coat to the primer coat and topcoat and each set of plates is also tested for corrosion resistance. In the Gravelometer chip test, the panels are chilled to −10° C. and the gravel about ¼ to ½″ in diameter is thrown against the panel at about 80 pounds per square inches air pressure. Each of the above steel panels exhibited excellent chip resistance, good corrosion resistance and the sealer composition had excellent adhesion to the primer substrate and to the top coat.

EXAMPLE 2

A mill base is prepared by blending together the following ingredients:

| | Parts by weight |
|---|---|
| Epoxy/MALOFA resin solution (prepared in Example 1) | 90 |
| Dimethylethanolamine | 13 |
| Deionized water | 245 |
| Carbon black pigment (electrically conductive carbon black pigment) | 30 |
| Aluminum silicate pigment | 102 |
| Titanium dioxide pigment | 68 |
| Total | 548 |

The above ingredients are blended together in the order given and charged into a shot mill and shaken for thirty minutes to form a pigment dispersion having a total solids of 46%, a pigment solids of 36.5% and a binder solids of 9.5%.

The following coating compositions are prepared:

| | Coating composition | | | |
|---|---|---|---|---|
| | 1 | 2 | 3 | 4 |
| Ingredients, parts by weight: | | | | |
| Epoxy MALOFA resin solution (prepared in Example 1) | 53.5 | 60.5 | 59.5 | 66.5 |
| Epoxy acrylic graft copolymer solution (prepared in Example 1) | 15.0 | 15.0 | 6.3 | 6.4 |
| Dimethylethanolamine | 7.5 | 8.5 | 8.5 | 9.5 |
| Deionized water | 73.0 | 63.0 | 75.0 | 65.0 |
| Mill base (prepared above) | 137.0 | 96.0 | 137.0 | 96.0 |
| Total | 286.0 | 243.0 | 286.3 | 243.4 |
| Total solids, percent | 35 | 35 | 35 | 35 |
| Pigment/binder ratio | 100/100 | 70/100 | 100/100 | 70/100 |
| pH | 9.3 | 9.3 | 9.3 | 9.3 |

Each of the above sealer compositions is then reduced 100 percent by volume with deionized water to form a sprayable sealer composition and in each case 20 parts by volume of ethylene glycol monobutyl ether is added to the composition.

Each of the above sealer compositions is then sprayed onto the following primed steel panels: a steel panel primed with the conventional alkyd resin primer, a steel panel primed with the conventional alkyd resin black dipped primer, a steel panel primed with an electrodeposited pigmented maleinized oil primer and a steel panel primed with an electrodeposited oxide pigmented primer of styrene allyl alcohol/maleinized oil. After each of the sealers are sprayed onto the primed steel panels, the panels are air dried providing a sealer coating about 0.3 mil in thickness. Each of the panels is then coated with a standard acrylic automotive topcoat lacquer and then the panels are baked for thirty minutes at about 160° C.

Each of the panels is then tested for chip resistance by standard Gravelometer chip test described in Example 1. Each of the panels has an acceptable chip resistance which indicates that the adhesion of the sealer to the primer and to the acrylic topcoat is good.

EXAMPLE 3

A high molecular weight Epoxy/MALOFA resin solution is prepared as follows:

| | Parts by weight |
|---|---|
| Portion 1: | |
| Epoxy resin ("Epon" 1004 [1]) | 638 |
| Bisphenol A (described in Example 1) | 56 |
| Ethylene glycol monobutyl ether acetate | 220 |
| Cyclohexanone | 80 |
| Acetone | 8 |
| Portion 2: | |
| Dimethyl benzylamine | 6 |
| Acetone | 82 |
| Diethylamine | 6 |
| Portion 3: | |
| Acetone | 42 |
| Portion 4: | |
| MALOFA resin solution (prepared in Example 1) | 333 |
| Portion 5: | |
| Ethylene glycol monobutyl ether | 195 |
| Total | 1666 |

[1] "Epon" 1004 has the following structural formula

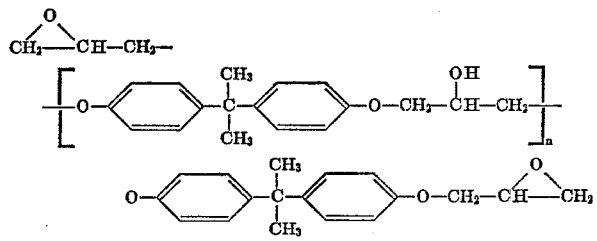

$n$ is a positive integer sufficiently large to provide a Gardner-Holdt viscosity measured on undiluted resin at 25° C. of Q–U poises and has an epoxy equivalent of 875–1025. The epoxy equivalent is the grams of resin containing 1-gram equivalent of epoxide.

Portion 1 is charged into a reaction vessel equipped with a stirrer, a reflux condenser and a heating mantel and the reaction mixture is heated to its reflux temperature over a 30 minute period and held at its reflux temperature for about 2 hours. The heat source is then removed and Portion 2 is then slowly added over a 30 minute period. Portion 3 is added and the temperature of the reaction mixture is held at about 90° C. for about 20 minutes; then Portion 4 is added and the reaction mixture is held at about 90° C. for about 1½ hours; then portion 5 is added.

The resulting polymer has an acid number of 85 and the polymer solution has a Gardner-Holdt viscosity of Z6+2 measured at 25° C. and a solids content of about 58%.

A polymer solution is prepared by blending together the following ingredients:

| | Parts by weight |
|---|---|
| Epoxy/MALOFA solution (prepared above) | 300 |
| Epoxy acrylic graft copolymer solution (prepared in Example 1) | 88 |
| Dimethylethanolamine | 42 |
| Deionized water | 500 |
| Total | 930 |

The polymer solution has a pH of 9.3.

A mill base is then prepared as follows:

| | Parts by weight |
|---|---|
| Polymer solution (prepared above) | 348 |
| Carbon black pigment (described in Example 1) | 45 |
| Titanium dioxide pigment | 100 |
| Total | 493 |

The above ingredients are mixed together in the order given and charged into a steel ball mill and ground for 16 hours. The resulting mill base has a solids content of about 38%, and a pigment to binder ratio of 1895:100.

A water reducible sealer composition is prepared as follows:

| | Parts by weight |
|---|---|
| Polymer solution (prepared above) | 360 |
| Mill base (prepared above) | 122 |
| Total | 482 |

The above ingredients are thoroughly blended together to form a sealer composition having a solids content of about 28% and a pigment to binder ratio of about 36:100. The sealer is reduced to a spray viscosity by reducing the sealer with an equal volume of water.

The sealer is sprayed onto a steel panel primed with an iron oxide alkyd resin primer and air dried several seconds to provide a 0.3 mil thick sealer. A conventional acrylic lacquer topcoat is then applied and the panel is baked. The panel has excellent chip and corrosion resistance indicating excellent adhesion of the topcoat and primer to the sealer coat.

What is claimed is:

1. An aqueous sealer composition comprising about 2–50% by weight of a binder dispersed in water, wherein the binder consists essentially of
   (A) 60–95% by weight, based on the weight of the binder, of an epoxy ester resin of a maleinized drying oil fatty acid and an epoxy resin wherein the maleinized drying oil fatty acid is the reaction product of maleic anhydride and drying oil fatty acids selected from the group consisting of linseed oil fatty acids, tung oil fatty acids, soya oil fatty acids and dehydrated castor oil fatty acids and the epoxy resin is of the formula

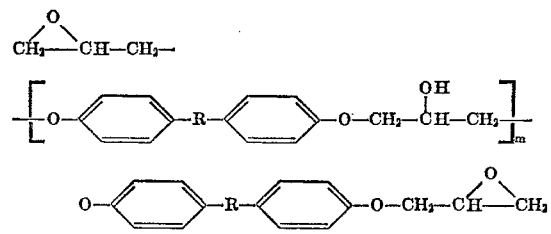

where R is an alkylene group having 1–4 carbon atoms and $m$ is 0 or a positive integer sufficiently large to provide a weight average molecular weight of about 400–4,000; and
   (B) 5–40% by weight, based on the weight of the binder, of an acrylic epoxy ester graft copolymer having a number average molecular weight of about 10,000–150,000 and a polymeric backbone segment and polymeric side chain segments; wherein
      (1) the polymeric backbone segment of the graft copolymer comprises 20–80% by weight of the graft copolymer, and consists essentially of polymerized units selected from the group consisting of methyl methacrylate, styrene, ethyl acrylate, acrylonitrile and mixtures thereof; 0.5–5% by weight of adhesion promoting units selected from the group consisting of tertiary butyl amino ethyl methacrylate and diethylaminoethyl methacrylate; 1–7% by weight of an acid selected from the group consisting of methacrylic acid and acrylic acid that has been reacted with an alkylene imine selected from the group consisting of ethylene imine and propylene imine; and
      (2) the polymeric side chain segments of the graft copolymer comprise correspondingly 80–20% by weight of the graft copolymer and are grafted into the backbone segment and have the formula

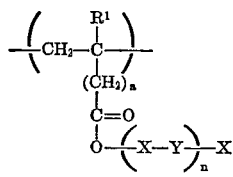

wherein a is 0–1 and when a is 1, $R^1$ is

that has been reacted with said alkylene imine and when a is 0, $R^1$ is

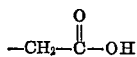

that has been reacted with an alkylene imine, X is a polyphenoxy polyether resin having a weight average molecular weight of about 400–4,000, Y is the residual of a saturated aliphatic dicarboxylic acid having 4–15 carbon atoms or a dimer fatty acid and n is a positive integer of 3 to 10; wherein the sealer composition is at least partially neutralized with ammonium hydroxide or a water-soluble amine and has a pH of about 7–11.

2. The sealer composition of Claim 1 having a polymeric binder content of 5–25% by weight and wherein the polymeric binder components comprise 75–90% by weight of the epoxy ester resin of a maleinized drying oil fatty acid and an epoxy resin and 10–25% by weight of the acrylic epoxy ester graft copolymer.

3. The sealer composition of Claim 2 containing 0.1–30% by weight pigment.

4. The sealer composition of Claim 3 in which the graft copolymer has a number average molecular weight of about 15,000–50,000 and the backbone segment comprises 30–60% by weight of the graft copolymer and the side chain segment comprises 70–40% by weight of the graft copolymer.

5. The sealer composition of Claim 4 in which the polymer backbone segment consists essentially of methyl methacrylate, tertiary butylamino ethyl methacrylate, and methacrylic acid that has been reacted with propylene imine.

6. The sealer composition of Claim 4 in which the polymeric backbone consists essentially of methyl methacrylate, diethylamino ethyl methacrylate, methacrylic acid that has been reacted with propylene imine.

7. The sealer composition of Claim 4 wherein x of the polymeric side chain segment is a polyphenoxy polyether resin of the formula

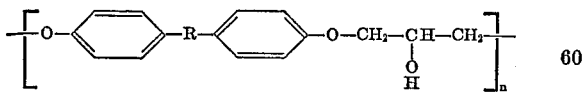

wherein R is an alkylene group of 1–4 carbon atoms, n is 0 or an integer sufficient to provide the epoxy resin with a weight average molecular weight of at least about 400 and up to about 4,000, wherein Y is the residual of a saturated aliphatic dicarboxylic acid having 4–10 carbon atoms.

8. The sealer composition of Claim 7 in which the drying oil fatty acid is linseed oil and the epoxy ester resin has an acid number of about 30–150.

9. The sealer composition of Claim 8 in which $R^1$ of the side chain segment of the graft copolymer has been reacted with propylene imine and Y is the residual of adipic acid.

10. The sealer composition of Claim 9 in which R of the epoxy resin and of the polyphenoxy polyether resin is selected from the group consisting of

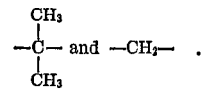

11. The aqueous sealer composition of Claim 1 comprising about 5–25% by weight of polymeric binder and 5–75% by weight of water and up to 20% by weight of an organic solvent for the binder; wherein the binder consists essentially of (A) 75–90% by weight, based on the weight of the binder of an epoxy ester resin of a maleinized drying oil fatty acid and an epoxy resin having an acid number of 30–150; wherein the maleinized dry oil is the reaction product of maleic anhydride and linseed oil fatty acids and the epoxy resin is of the formula

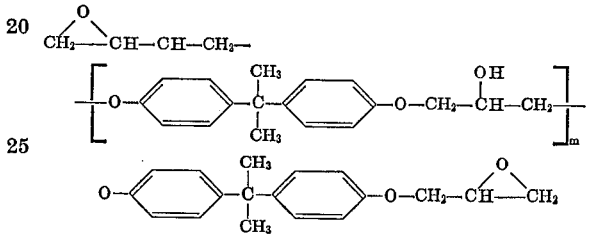

wherein m is 0 or a positive integer sufficiently large to provide a weight average molecular weight of about 400–4,000; and correspondingly (B) 10–25% by weight, based on the weight of the binder, of an acrylic epoxy ester graft copolymer having a number average molecular weight of about 15,000–50,000 and a polymeric backbone segment and a polymeric side chain segment wherein,
(1) the polymeric backbone segment of the graft copolymer comprises 30–60% by weight of the graft copolymer and consists essentially of polymerized units of methyl methacrylate, 1–7% by weight of methacrylic acid that has been reacted with propylene imine, and 0.5–5% by weight of tertiary butyl amino ethyl methacrylate;
(2) polymeric side chain segments correspondingly comprises 70–40% by weight of the graft copolymer and are grafted into the backbone segment and have the formula

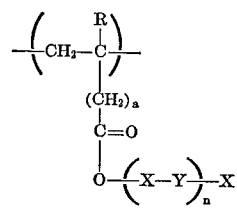

wherein a is 0–1 and when a is 1, R is

that has been reacted with propylene imine and when a is 0, R is

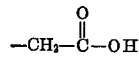

that has been reacted with propylene imine, X is a polyphenoxy polyether resin that has the following recurring units

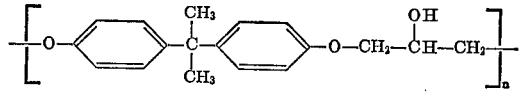

where n is 0 or an integer sufficiently large to provide the resin with a weight average molecular weight of 400–4,000, and Y is the residual of adipic acid, itaconic acid and n is a positive integer of 4–6; wherein the sealer composition is neutralized with a water soluble amine to a pH of about 9–10.

12. The sealer composition of Claim 11 containing about 10–25% by weight of pigment which comprises titanium dioxide pigment, electrically conductive carbon black pigment, and aluminum silicate pigment.

References Cited

UNITED STATES PATENTS

| | | | |
|---|---|---|---|
| 3,707,516 | 12/1972 | Walus | 260—21 |
| 3,716,506 | 2/1973 | Simms et al. | 260—22 CB |
| 3,236,795 | 2/1966 | Graver | 260—23 EP |
| 3,272,647 | 9/1966 | Swanson et al. | 117—75 |
| 3,505,269 | 4/1970 | Jeffery et al. | 260—32.8 |
| 3,509,086 | 4/1970 | Rohrbacher | 260—32.8 |
| 3,635,875 | 1/1972 | Reither et al. | 260—37 EP |
| 3,678,013 | 7/1972 | Sherwood | 260—2 EN |

DONALD E. CZAJA, Primary Examiner

R. W. GRIFFIN, Assistant Examiner

U.S. Cl. X.R.

117—75, 132 BE, 161 ZB; 260—21, 22 CB, 23 AR, 29.2 EP, 32.4, 32.6 R